(12) United States Patent
Lafferty et al.

(10) Patent No.: US 11,660,851 B2
(45) Date of Patent: *May 30, 2023

(54) CLOSED-LOOP ADJUSTMENT SYSTEM AND METHOD FOR GAP CONTROL AND LEVELING OF ULTRASONIC DEVICES

(71) Applicant: Curt G. Joa, Inc., Sheboygan Falls, WI (US)

(72) Inventors: Justin M. Lafferty, Sheboygan, WI (US); David E. Schuette, Kiel, WI (US)

(73) Assignee: CURT G. JOA, INC., Sheboygan Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,910

(22) Filed: Jul. 21, 2022

(65) Prior Publication Data
US 2022/0347998 A1    Nov. 3, 2022

Related U.S. Application Data (63) Continuation of application No. 16/591,122, filed on Oct. 2, 2019, now Pat. No. 11,426,992.
(Continued)

(51) Int. Cl.
  *B32B 41/00*    (2006.01)
  *B32B 37/00*    (2006.01)

(52) U.S. Cl.
  CPC .......... *B32B 41/00* (2013.01); *B32B 37/0046* (2013.01); *B32B 2041/04* (2013.01); *B32B 2309/72* (2013.01); *B32B 2310/028* (2013.01)

(58) Field of Classification Search
  CPC . B32B 41/00; B32B 37/0046; B32B 2041/04; B32B 2309/72; B32B 2310/028
(Continued)

(56) References Cited

U.S. PATENT DOCUMENTS 6,547,903 B1    4/2003    McNichols et al.
7,108,764 B2    9/2006    Schneider
(Continued)

FOREIGN PATENT DOCUMENTS

DE    10301433 A1    7/2004
JP    2013063521 A    4/2013
WO    WO2006074101 A1    7/2006

*Primary Examiner* — Michael N Orlando
*Assistant Examiner* — Joshel Rivera
(74) *Attorney, Agent, or Firm* — Klintworth & Rozenblat IP LLP (57) ABSTRACT

An apparatus and method for leveling a bonding device and anvil in an assembly via a closed-loop control system is provided. The assembly includes an anvil, a bonding device positioned adjacent the anvil and configured to interact with the anvil to form the bonds on the web, and an actuator that enables adjustment of an orientation between the bonding device and the anvil. The assembly also includes a closed-loop control system configured to control operation of the actuator, with the closed-loop control system configured to monitor an operational parameter of the assembly indicative of interaction of the bonding device with the anvil, determine whether the bonding device is parallel or substantially parallel with the anvil based on the operational parameter, and when the bonding device is not parallel or substantially parallel with the anvil, cause the actuator to adjust the orientation between the bonding device and the anvil.

22 Claims, 6 Drawing Sheets

Related U.S. Application Data

(60) Provisional application No. 62/741,263, filed on Oct. 4, 2018.

(58) Field of Classification Search
USPC .................. 156/60, 64, 350, 351, 378, 379
See application file for complete search history.

(56) References Cited

U.S. PATENT DOCUMENTS

| | | |
|---|---|---|
| 9,296,255 B2 | 3/2016 | Vogler et al. |
| 11,426,992 B2 * | 8/2022 | Lafferty .................. B32B 41/00 |
| 2002/0062903 A1 | 5/2002 | Couillard et al. |
| 2003/0111157 A1 | 6/2003 | Ehlert et al. |
| 2006/0144904 A1 | 7/2006 | Mlinar et al. |
| 2010/0276061 A1 | 11/2010 | Oblak et al. |
| 2011/0041982 A1 | 2/2011 | Fleming et al. |
| 2012/0111475 A1 | 5/2012 | Ippers et al. |
| 2012/0180929 A1 | 7/2012 | Koetting et al. |
| 2014/0138012 A1 | 5/2014 | Spicer et al. |
| 2015/0165673 A1 | 6/2015 | Spicer et al. |
| 2016/0279859 A1 | 9/2016 | McKay et al. |
| 2016/0318120 A1 | 11/2016 | Okada et al. |
| 2017/0129062 A1 | 5/2017 | Caldwell et al. |
| 2017/0220027 A1 | 8/2017 | Spicer et al. |

\* cited by examiner

CLOSED-LOOP ADJUSTMENT SYSTEM AND METHOD FOR GAP CONTROL AND LEVELING OF ULTRASONIC DEVICES

CROSS-REFERENCE TO RELATED APPLICATION

This application is a continuation application of, and claims priority to U.S. patent application Ser. No. 16/591,122, filed Oct. 2, 2019 which claims the benefit of U.S. Provisional Application No. 62/741,263, filed Oct. 4, 2018 which are both incorporated herein by reference.

BACKGROUND OF THE INVENTION

The present invention relates to disposable garments and more specifically, to systems and methods for making disposable garments. More specifically, the invention relates to ultrasonic bonding of garment layers and to the control and adjustment of the spacing and angling between an ultrasonic horn and patterned anvil in an ultrasonic assembly.

Ultrasonic technology is used, among other technologies, to bond non-woven fabric garment layers, as an alternative to (or to reduce the use of) consumables such as adhesives or glue. Ultrasonic energy is concentrated at specific bond points where frictional heat bonds non-woven fabric of the garment layers. An ultrasonic bonding system contains at least one patterned anvil that communicates with at least one ultrasonic horn. The patterned anvil contains a predetermined pattern created by raised regions on the anvil. The ultrasonic horn contains an ultrasonic emitting assembly. Layers of non-woven fabric, which may or may not contain additional garment components, are passed between the patterned anvil and the ultrasonic horn. The layers contact the raised pattern on the patterned anvil. While in contact with the raised pattern, the layers pass through an ultrasonic emission created by the ultrasonic horn. The ultrasonic emission increases the vibrations of the particles in the non-woven garment, thus increasing the temperature of the particles in the non-woven garment. The increased temperatures of the garment particles in the multiple layers of non-woven fabric result in bonding of the multiple layers of non-woven fabric along the raised patterns of the patterned anvil.

The ultrasonic horn should ideally be maintained at a constant and predetermined distance from the layers of non-woven fabric over a cross-machine direction length of the ultrasonic horn. Methods to monitor and control the constant and predetermined distance over the cross-machine direction length of the ultrasonic horn have typically been performed manually by an operator loosening and tightening a series of bolts on the ultrasonic horn. The operator manually loosens the bolts, manually adjusts a gap, or distance, between the ultrasonic horn and the patterned anvil, and manually adjusts the level of the ultrasonic horn with respect to the patterned anvil. However, this method often results in an ultrasonic horn placement where the distance between the ultrasonic horn and the patterned anvil is not ideal. As a result of this non-ideal gap or distance, the layers of non-woven fabric will experience varied bonding conditions over the cross-machine direction length. Locations where the distance between the ultrasonic horn and patterned anvil may be less than ideal may result in a 'blow-out' phenomenon in which in the ultrasonic energy creates a hole through the layers of non-woven fabric. Locations where the distance between the ultrasonic horn and patterned anvil may be less than ideal may result in the layers of non-woven fabric not becoming bonded together.

Further, the leveling of the ultrasonic horn and the adjusting of the gap or distance between the ultrasonic horn and patterned anvil is not a singular event. Instead, the adjustment of the gap or distance requires multiple adjustments over the operation of the machine. Every time the gap or distance between the ultrasonic horn and patterned anvil is adjusted manually and/or the ultrasonic horn is leveled, the machine is unable to be run during the manual adjustment process.

Therefore, a need exists for an automated system and method for adjusting the gap, or distance, between the ultrasonic horn and patterned anvil and for performing leveling of the ultrasonic horn and/or the anvil into a parallel arrangement. A need further exists for such gap adjustment and leveling to be performed while the machine continues to run, with such gap adjustment and leveling being periodically performed during operation of the machine.

BRIEF DESCRIPTION OF THE INVENTION

In accordance with one aspect of the invention, an apparatus for forming bonds on a web includes an anvil, a bonding device positioned adjacent the anvil and configured to interact with the anvil to form the bonds on the web, and an actuator that enables adjustment of an orientation between the bonding device and the anvil. The apparatus also includes a closed-loop control system configured to control operation of the actuator, the closed-loop control system configured to monitor an operational parameter of the apparatus indicative of interaction of the bonding device with the anvil, determine whether the bonding device is parallel or substantially parallel with the anvil based on the operational parameter, and when the bonding device is not parallel or substantially parallel with the anvil, cause the actuator to adjust the orientation between the bonding device and the anvil.

In accordance with another aspect of the invention, a method for leveling a bonding device and anvil in an assembly via a closed-loop control system is provided. The method includes monitoring an operational parameter of the assembly indicative of interaction of the bonding device with the anvil and determining, based on the operational parameter, whether the bonding device and the anvil are parallel or substantially parallel. The method also includes controlling an actuator to adjust an orientation between the bonding device and the anvil when the bonding device and the anvil are determined to not be parallel or substantially parallel. The monitoring of the operational parameter and the operation of the actuator to adjust the orientation between the bonding device and the anvil is performed via a closed-loop control scheme.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the present invention provide for a method and apparatus for leveling of the ultrasonic horn and/or patterned anvil in an ultrasonic assembly into a parallel or substantially parallel arrangement and for adjusting the gap, or distance, between of the ultrasonic horn and the anvil.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined in the specification.

Figure 1:
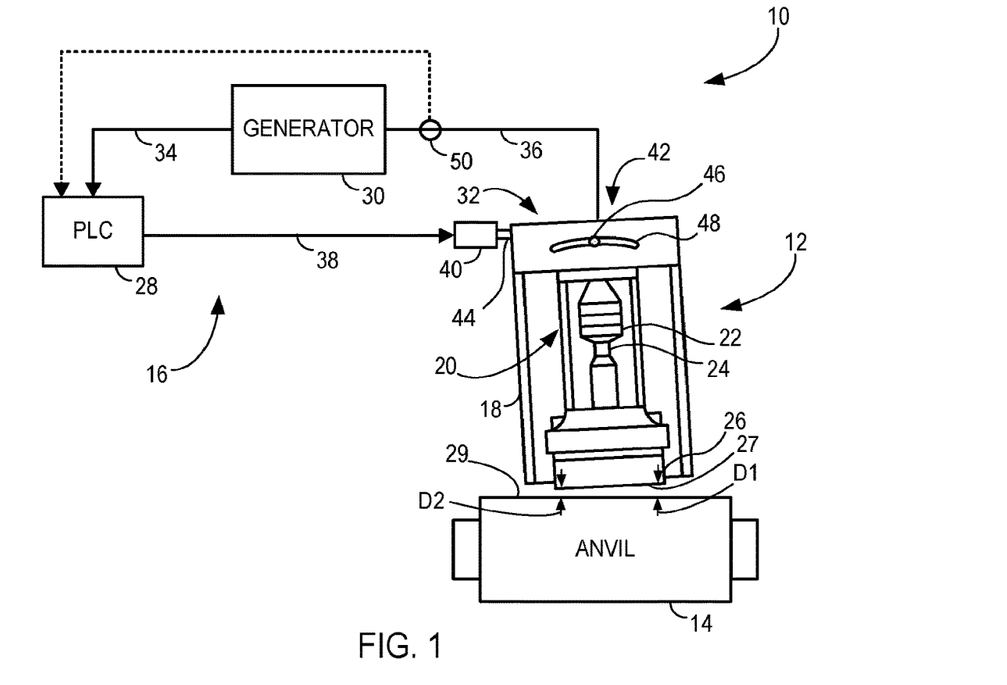
FIG. 1 is a system view of a bonding assembly that includes a closed-loop control system for leveling and gap adjustment between an ultrasonic horn and patterned anvil, with the ultrasonic horn and patterned anvil in a non-level or non-parallel arrangement, according to an embodiment of the invention.
Figure 2:
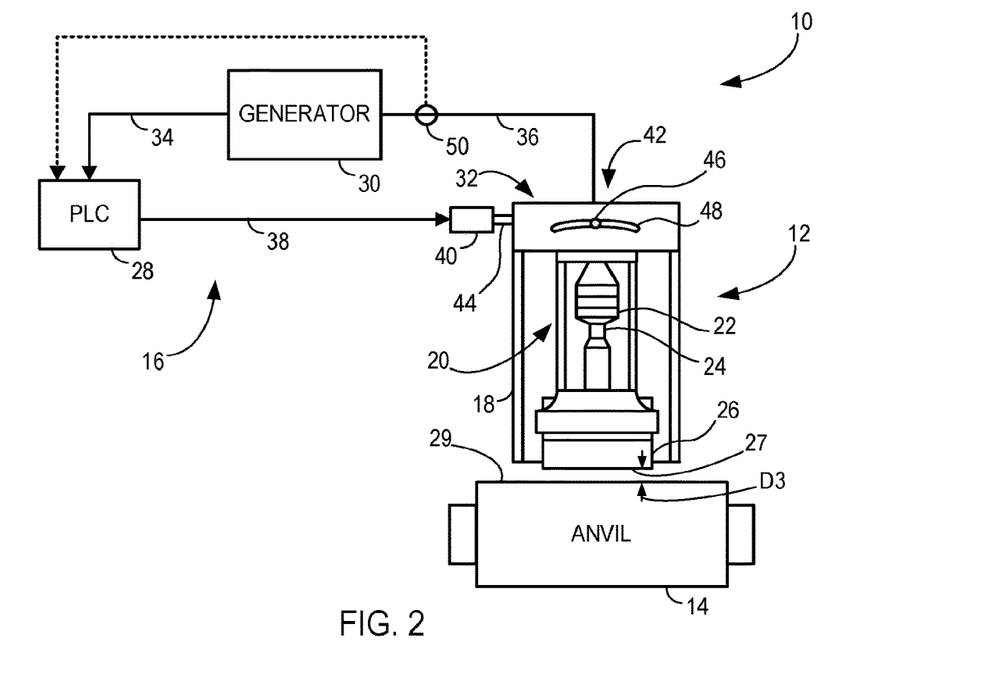
FIG. 2 is a system view of the bonding assembly of FIG. 1 illustrating the ultrasonic horn and patterned anvil in a level or parallel arrangement.

With attention to FIGS. 1 and 2, a bonding apparatus or assembly 10 is illustrated, according to an embodiment of the invention. According to an exemplary embodiment, the bonding assembly 10 comprises an ultrasonic assembly that functions to ultrasonically form bonds on one or more web materials and/or elastics, and thus hereafter bonding assembly 10 is referred to as ultrasonic assembly 10. It is recognized, however, that the bonding assembly 10 could alternatively be configured to perform other types of bonding, including thermal or pressure bonding, for example, and thus embodiments of the invention are not limited only to ultrasonic bonding.

As shown in FIGS. 1 and 2, the ultrasonic assembly 10 comprises at least one ultrasonic horn assembly 12 and at least one patterned anvil 14 (hereinafter "anvil 14"), according to known constructions, along with a closed-loop control system 16. The ultrasonic assembly 10 may be any of a number of known ultrasonic bonding or welding systems, such as a rotary anvil and an ultrasonic blade horn, also known as a sonotrode, which cooperate with each other to form bonds on one or more web materials and/or elastics (not shown) that is passed between the ultrasonic horn assembly 12 and anvil 14. The ultrasonic horn assembly 12 and anvil 14 are positioned in a spaced relationship relative to one another to facilitate ultrasonically bonding the web materials/elastics. During the bonding process, the web layers are exposed to an ultrasonic emission from the ultrasonic horn assembly 12 that causes the particles in the web layers to vibrate. The ultrasonic emission or energy is concentrated at specific bond points where frictional heat fuses the web layers together without the need for consumable adhesives.

The ultrasonic assembly 10 may include a single ultrasonic horn assembly 12 in communication with a single anvil 14, as shown in FIGS. 1 and 2. Alternatively, multiple ultrasonic horn assemblies 12 may be in communication with a single anvil 14, a single ultrasonic horn assembly 12 may be in communication with multiple anvils 14, or multiple ultrasonic horn assemblies 12 may be in communication with multiple anvils 14 in various arrangements.

As shown in FIGS. 1 and 2, the ultrasonic horn assembly 12 comprises an assembly holder 18 and an ultrasonic stack 20 of components, with the holder 18 mechanically coupled to the ultrasonic stack 20. According to an exemplary embodiment, the ultrasonic stack 20 includes a converter 22, a booster 24, and a horn 26. The converter 22 receives a high frequency AC current from the generator 30 indicative of a desired operation of the ultrasonic horn assembly 12 and transforms the signal into a mechanical vibration or ultrasonic emission. The ultrasonic emission is amplified via booster 24 and is transmitted to the horn 26. Based on the interaction of the horn 26 and anvil 14, the ultrasonic emission or energy is concentrated at specific bond points, where frictional heat fuses the web layers together. Booster 24 may be omitted in alternative embodiments.

The closed-loop control system 16 is configured to determine a leveling condition of the ultrasonic horn assembly 12 (i.e., of horn 26) with respect to the anvil 14. As can be seen in FIGS. 1 and 2, in a non-level condition (FIG. 1), a distance D1 between the horn 26 and anvil 14 at a first location is different from a distance D2 between the horn 26 and anvil 14 at a second location, while when in a level condition (FIG. 2), the distances D1, D2 are equal or substantially equal to each other—i.e., a distance D3, such that the facing surfaces 27, 29 of the horn 26 and anvil 14 are parallel (i.e., level) or substantially parallel with one another. As used herein, "substantially parallel" means parallel to within +/−5 degrees.

In the illustrated embodiment, closed-loop control system 16 comprises a programmable logic controller (PLC) 28, a generator 30, and an actuator 32. The elements/components of the closed-loop control system 16 are in operable communication with each other, with the generator 30 in operable communication with the PLC 28 along a generator/PLC communication 34, the generator 30 in operable communication with the ultrasonic horn assembly 12 along a high frequency cable or communication 36, and the PLC 28 in operable communication with the actuator 32 along a PLC/actuator communication 38. The generator 30 and PLC 28 function to monitor one or more operational parameters of the ultrasonic assembly 10 indicative of interaction of the ultrasonic horn assembly 12 with the anvil 14 and determine a condition of the ultrasonic horn assembly 12, such as a leveling condition of the ultrasonic horn assembly 12 with respect to the anvil 14. The PLC 28 then generates and transmits control signals to the actuator 32 based on the determination of the leveling condition, with the control signals controlling operation of actuator 32.

The actuator 32 of the closed-loop control system is coupled to the assembly holder 18 to provide for movement and/or rotation thereof—and to thereby also cause movement or rotation of the ultrasonic stack 20. The actuator 32 comprises a drive 40, such as a servo motor, that operates to cause movement of an adjustment mechanism 42—with the drive 40 coupled to the adjustment mechanism 42 via a linkage system 44. The adjustment mechanism 42 that is driven by drive 40 may be any of a number of suitable mechanisms, such as an arrangement of a slide mechanism 46 and channel 48 (as illustrated in FIGS. 1 and 2), a rack and pinion device, rocker assembly, or threaded rod and plate assembly, according to embodiments of the invention. The repositioning of the ultrasonic stack 20 via operation of actuator 32 serves to adjust the orientation of the horn 26 relative to the anvil 14, so as to provide for leveling of the horn 26 and the anvil 14.

According to embodiments of the invention, operation of the actuator 32 to adjust positioning of the ultrasonic stack 20 is controlled based on a determination of a leveling condition of the horn 26 with respect to the anvil 14. The determination of the leveling condition of the horn 26 and anvil 14 is performed by the PLC 28 based on the measurement of one or operational parameters associated with operation of the ultrasonic horn assembly 12. According to various embodiments, the operational parameter(s) may be measured directly by the generator 30, by a separate sensor included on cabling connecting the generator 30 to the ultrasonic horn assembly, or by other external sensors positioned on the horn or anvil.

In one embodiment, the generator 30 directly measures power values associated with, or correlated to, the interaction of the horn 26 with the anvil 14. That is, in operation of ultrasonic horn assembly 12, command signals are initially provided to converter 22 (from generator 30) that are indicative of a desired ultrasonic emission to be output by horn 26 for forming bonds on the web layer(s) positioned between the horn 26 and the anvil 14, with the converter 22 and (optional) booster 24 transforming the received command signals into a final output to the horn 26 that causes output of the ultrasonic emission. The resulting power or energy that is transferred to the web layer(s) for the formation of bonds is dependent on the arrangement of the horn 26 relative to the anvil 14 and may be measured by the generator 30 based on the outgoing current demanded by the horn 26.

In operation, the generator 30 acquires a plurality of power readings that are indicative of the operation of the ultrasonic horn assembly 12 and of a leveling condition of the horn 26 with respect to the anvil 14. The generator 30 provides those measurements to the PLC 28 for comparison thereof and determination of the leveling condition. More specifically, the PLC 28 compares a plurality of power readings in order to identify a maximum power value that corresponds to a level or parallel arrangement between the horn 26 and the anvil 14.

In performing a method for leveling the horn 26 relative to the anvil 14, the generator 30 begins by measuring a first power value with the horn 26 at a first position or orientation and providing those measurements to the PLC 28. Subsequent to the measurement, the PLC 28 functions to operate the actuator 32 to reorient the horn 26 relative to the anvil 14—with the actuator 32 causing the horn 26 to rotate in a first direction and to a second position. Upon reorienting the horn 26 to the second position, the generator 30 measures a second power value and provides those measurements to the PLC 28. The PLC 28 then compares the second power value to the first power value and, if the second power value is greater than the first power value, the PLC 28 operates the actuator 32 to reorient the horn 26 relative to the anvil 14—with the actuator 32 causing the horn 26 to continue rotating in the first direction and to a third position. This sequence of power measurements and rotation of horn 26 in the first direction continues until the measured power value at a new horn position is less than the measured power value at the previous horn position. When the new power value is less than the previous power value, PLC 28 operates the actuator 32 to rotate the horn 26 in a second direction (opposite the first direction), to return the horn 26 to the position where the larger power value was measured.

Conversely, if upon reorienting the horn 26 to the second position, the measured second power value is less than the first power value, the PLC 28 operates the actuator 32 to successively rotate the horn in the second direction to one or more new positions. At each position generator 30 monitors a new power value and provides those measurements to the PLC 28. The PLC 28 compares each new power value to the previous power value. As long as the new power value is greater than the previous power value, PLC 28 continues to rotate the horn in the second direction. If the new power value is less than the previous power value, PLC 28 either maintains the horn 26 in the current position or operates the actuator 32 to rotate the horn 26 in the first direction, to return the horn 26 to the position where the larger power value was measured. This larger power value is referred to hereafter as the maximum power value.

In general, during a leveling or paralleling operation the PLC 28 will generate commands that operate the actuator 32 to continue to rotate the horn 26 in the same direction as long as a subsequent power value reading/measurement is greater than the previous power value reading/measurement, in order to search for a position or orientation of the horn 26 that provides maximum power—i.e., a level or parallel position. Upon a subsequent power value reading/measurement being less than the previous power value reading/measurement, the PLC 28 will flag the previous position as the level or parallel position and cause the horn 26 to stay in the current orientation or rotate back to the level or parallel position at which the maximum power value was measured. In an instance where the previous and subsequent power values are equal, PLC 28 may cause the horn 26 to stay in the current orientation. Accordingly, adjustment of the horn 26 from a non-level position (FIG. 1) to a position where surface 27 of the horn 26 is level/parallel with the facing surface 29 of the anvil 14 (FIG. 2) may be achieved.

While operation of the generator 30 is described above as measuring power values from the ultrasonic horn assembly 12, it is recognized that generator 30 could alternatively measure other operational parameters, including capacitance, frequency, or amplitude, as non-limiting examples, in order to determine the leveling condition. Determination of the leveling condition with measurement of any of the parameters would be similar to the method described above, with the PLC 28 comparing a plurality of readings in order to identify a specified parameter value (e.g., maximum value) that corresponds to a level or parallel arrangement between the horn 26 and the anvil 14.

Referring still to FIGS. 1 and 2, according to another embodiment, a dedicated induction sensor 50 (shown in phantom) positioned on or integrated into the high frequency cable 36 is used to monitor operation of the ultrasonic horn assembly 12 rather than the generator 30 performing this function. In such an embodiment, generator 30 still operates to provide command signals to converter 22 that are indicative of a desired ultrasonic emission to be output by horn 26 for forming bonds on the web layer(s) positioned between the horn 26 and the anvil 14, with the converter 22 and (optional) booster 24 transforming the received command signals into a final output to the horn 26 that causes output of the ultrasonic emission. However, the generator 30 is not configured to directly measure or monitor power signals fed back from the ultrasonic horn assembly 12, and thus a separate induction sensor 50 is employed to monitor operation of the ultrasonic horn assembly 12. Such an induction sensor 50 may be used to retrofit an existing ultrasonic assembly 8 (and generator 30) to enable the assembly 8 to perform a determination of the leveling condition of the horn 26 with respect to the anvil 14.

In operation, induction sensor 50 measures electrical current values on the high frequency cable 36 in order to identify a power reading/value indicative of the interaction of the horn 26 with the anvil 14, so as to provide for a determination of the leveling condition of the horn 26 with respect to the anvil 14. The measured current values—and subsequently derived power values—are provided to the PLC 28, where comparison of the power values is performed in order to determine the leveling condition. That is, the PLC 28 compares a plurality of power readings in order to identify a maximum current value that corresponds to a level or parallel arrangement between the horn 26 and the anvil 14.

The method for leveling the horn 26 relative to the anvil 14 using induction sensor 50 is similar to that described above where power values are measured directly by generator 30. The induction sensor 50 measures a first current/power value with the horn 26 at a first position or orientation and provides those measurements to the PLC 28. Subsequent to the measurement, the PLC 28 functions to operate the actuator 32 to thereby reorient the ultrasonic horn 26 relative to the anvil 14—with the actuator 32 causing the horn 6 to rotate in a first direction and to a second position. Upon reorienting of the ultrasonic horn assembly 12 to the second position, the induction sensor 50 measures a second current/power value and provides those measurements to the PLC 28. The PLC 28 then compares the second current/power value to the first current/power value and, if the second current/power value is greater than the first current/power value, the PLC 28 operates the actuator 32 to reorient the ultrasonic horn 26 relative to the anvil 14—with the actuator 32 causing the horn 6 to continue rotating in the first direction and to a third position. Conversely, if the second current/power value is less than the first current/power value, the PLC 28 then determines that the previous orientation of surface 27 of the horn 26 relative to the facing surface 29 of the anvil 14 was closer to parallel. The PLC 28 thus operates the actuator 32 to reorient the horn 26 relative to the anvil 14—with the actuator 32 causing the horn 26 to rotate in a second direction (opposite the first direction) and back to the first position.

Figure 3:
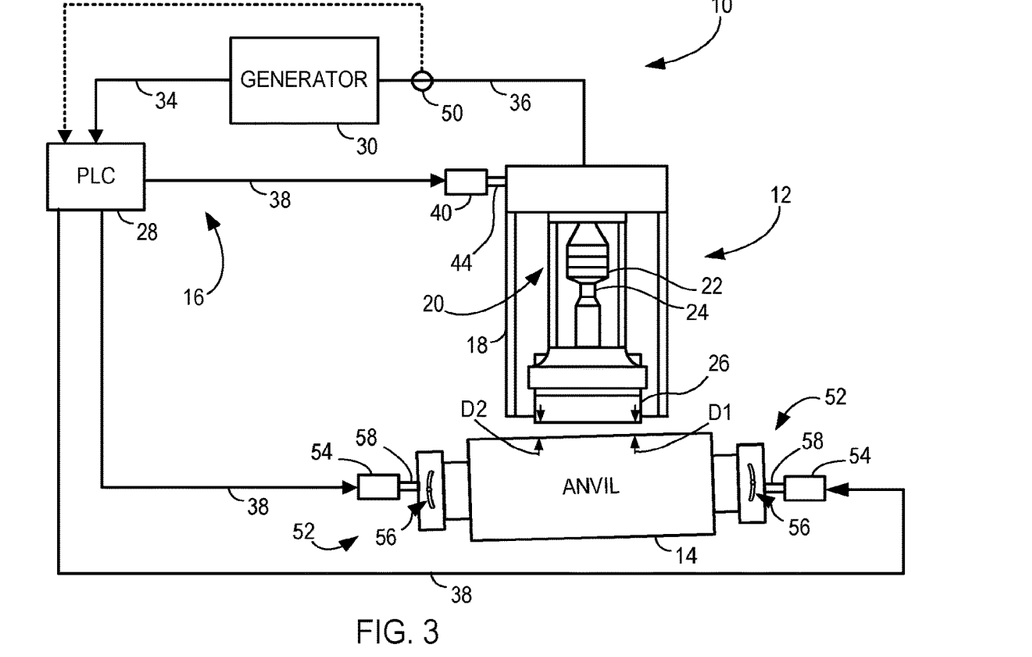
FIG. 3 is a system view of a bonding assembly that includes a closed-loop control system for leveling and gap adjustment between an ultrasonic horn and patterned anvil, with the ultrasonic horn and patterned anvil in a non-level or non-parallel arrangement, according to another embodiment of the invention.
Figure 4:
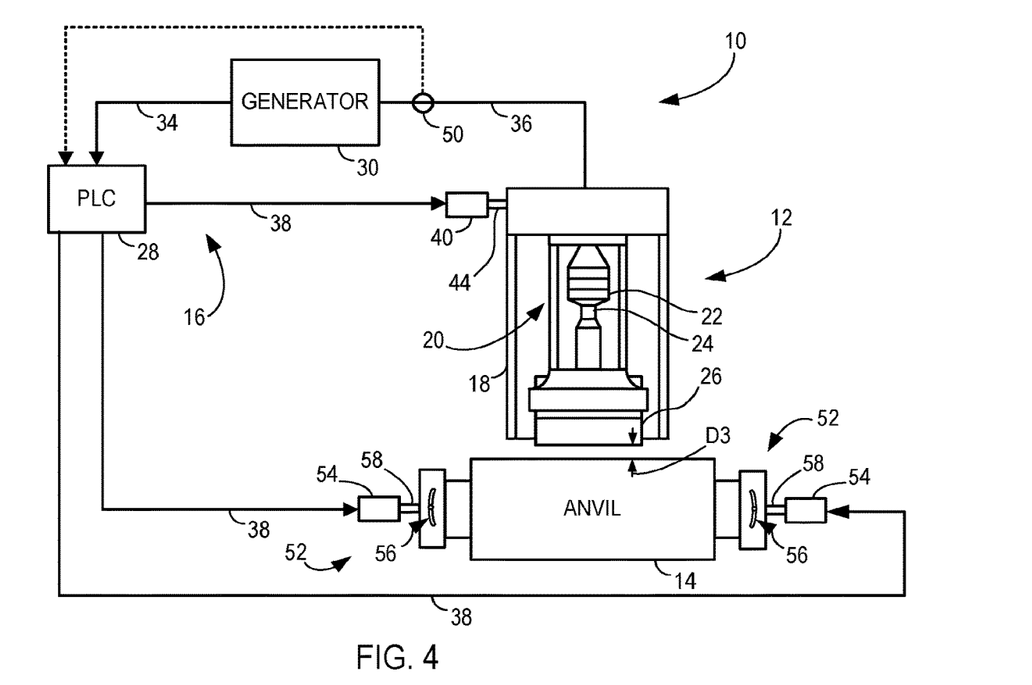
FIG. 4 is a system view of the bonding assembly of FIG. 3 illustrating the ultrasonic horn and patterned anvil in a level or parallel arrangement.

The embodiments described above and shown in FIGS. 1 and 2 are directed to a system and method for adjusting and reorienting the ultrasonic horn assembly 12 in order to level the horn 26 and anvil 14. FIGS. 3 and 4 depict an alternative embodiment that includes a system and method for adjusting and reorienting the anvil 14 in order to level the horn 26 and anvil 14 using a closed-loop control system 16 that is in operable communication with an actuator 52 that provides for movement and/or rotation of the anvil 14. The actuator 52 comprises a drive 54, such as a servo motor, that operates to cause movement of an adjustment mechanism 56—with the drive 54 coupled to the adjustment mechanism 56 via a linkage system 58. The adjustment mechanism 56 may be any of a number of suitable mechanisms, such as an arrangement of a slide mechanism and channel (as illustrated in FIGS. 3 and 4), a rack and pinion device, rocker assembly, or threaded rod and plate assembly, according to embodiments of the invention. The repositioning of the anvil 14 via operation of actuator 52 serves to adjust the orientation of the anvil 14 relative to the horn 26, so as to provide for leveling of the horn 26 and the anvil 14.

According to embodiments of the invention, the actuator 52 is controlled to adjust positioning of the anvil 14 based on a determination of a leveling condition of the anvil 14 with respect to the horn 26. As described above with regard to the embodiments in FIGS. 1 and 2, the generator 30 may measure power values indicative of the interaction of the horn 26 with the anvil 14 (or capacitance, frequency, or amplitude) or, alternatively, induction sensor 50 may measure current/power values indicative of the interaction of the horn 26 with the anvil 14, in order to provide for a determination of the leveling condition of the horn 26 and the anvil 14. The measured power/current values are provided to the PLC 28, where comparison of the power/current values is performed in order to determine the leveling condition.

The method for leveling the anvil 14 relative to the horn 26 using the measured power or current values is essentially identical to those described above. The position and orientation of the anvil 14 is incrementally adjusted by actuator 52 responsive to a plurality of comparisons of the power/current readings by the PLC 28, until the PLC 28 identifies a maximum power/current value that corresponds to a level or parallel arrangement between the horn 26 and the anvil 14.

Figure 5:
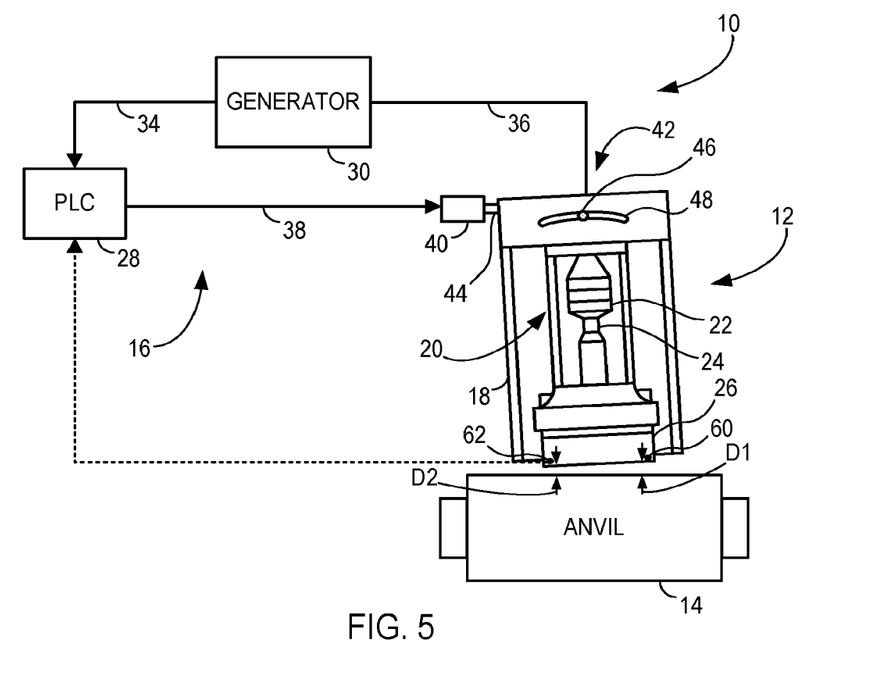
FIG. 5 is a system view of a bonding assembly that includes a closed-loop control system for leveling and gap adjustment between an ultrasonic horn and patterned anvil, with the ultrasonic horn and patterned anvil in a non-level or non-parallel arrangement, according to another embodiment of the invention.
Figure 6:
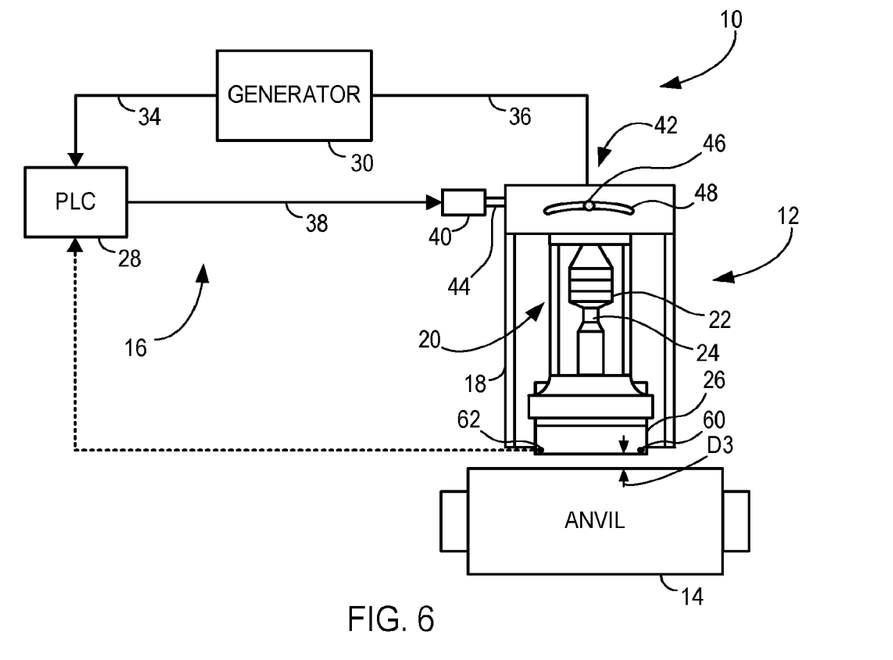
FIG. 6 is a system view of the bonding assembly of FIG. 5 illustrating the ultrasonic horn and patterned anvil in a level or parallel arrangement.

Referring now to FIGS. 5 and 6, according to another embodiment, one or more external sensors 60, 62 may be provided in order to measure one or more operational parameters associated with operation of a bonding assembly 10, for purposes of performing leveling in the assembly. In one embodiment, the external sensors 60, 62 are used in an ultrasonic assembly 10 (as described below), but it is recognized that the external sensors 60, 62 could be utilized for performing leveling in other bonding assemblies, such as a thermal bonding assembly or pressure bonding assembly.

In the embodiment illustrated in FIGS. 5 and 6, one or more external sensors 60, 62 are provided on either the horn or anvil in order to measure one or more operational parameters associated with operation of the ultrasonic assembly. The external sensors 60, 62 may be any of a number of types of known sensors, including load cells, optical sensors, EMF sensors, strain gauges, temperature sensors, or sonar sensors, for example. For purposes of explanation, the embodiment discussed here below is described with two sensors 60, 62 being in the form of load cells (hereinafter "load cells 60, 62") that acquire a force measurement. Additionally, while the load cells 60, 62 are illustrated as being incorporated into horn 26, it is recognized that the load cells 60, 62 could alternatively be incorporated into anvil 14. Yet other embodiments may include a single external sensor or three or more sensors.

According to an exemplary embodiment, a pair of load cells 60, 62 is provided on horn 26—with a first load cell 60 in close proximity to a first lateral side of the horn 26 and the second load cell 62 in close proximity to a second lateral side of the horn 26—such that the load cells 60, 62 are generally on opposing sides of the horn 26. With the load cells 60, 62 positioned in such a manner, the load cells 60, 62 operate to measure a force value at each of the opposing sides of the horn 26—hereinafter referred to as F1 and F2.

In operation, the load cells 60, 62 measure force values F1 and F2 indicative of the interaction of the ultrasonic horn 26 with the anvil 14 in order to provide for a determination of the leveling condition of the horn 26 with respect to the anvil 14. The measured force values F1 and F2 are provided to the PLC 28, where comparison of the force values F1 and F2 is performed in order to determine the leveling condition.

The method for leveling the ultrasonic horn 26 relative to the anvil 14 using measured force values begins with the load cells 60, 62 measuring force values F1, F2 with the horn 26 at a first position or orientation and providing these measurements to the PLC 28. Subsequent to the measurements, the PLC 28 then compares the force values F1, F2 to determine if the values are equal or within a predetermined standard deviation of one another. If the force values F1, F2 are equal (or within a predetermined standard deviation of one another), the PLC 28 determines that the horn 26 and anvil 14 are in a level or parallel arrangement, and thus no adjustment of the horn 26 is required. Conversely, if the force values F1, F2 are not equal (or within a predetermined standard deviation of one another), the PLC 28 determines that the horn 26 and anvil 14 are in a non-level arrangement and thus operates the actuator 32 to reorient the horn 26 relative to the anvil 14—with the actuator 32 causing the horn 26 to rotate in a first direction, from a first position to a second position.

Figure 7:
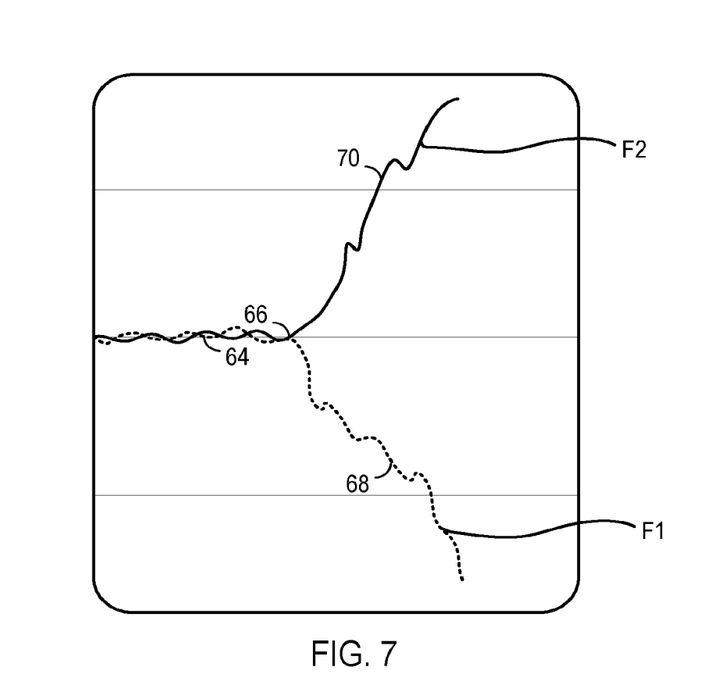
FIG. 7 is a graphical illustration of force value readings taken by the closed-loop control system of FIGS. 5 and 6 over time at opposing sides of the ultrasonic horn assembly and patterned anvil, indicating a non-parallel arrangement or non-level condition.
Figure 8:
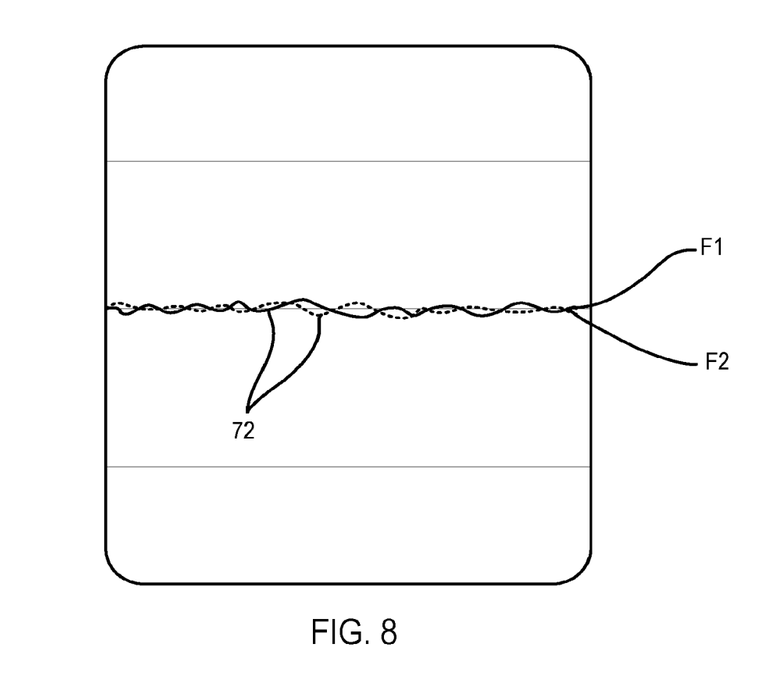
FIG. 8 is a graphical illustration of force value readings taken by the closed-loop control system of FIGS. 5 and 6 over time at opposing sides of the ultrasonic horn assembly and patterned anvil, indicating a parallel arrangement or level condition.

Upon the horn 26 rotating to the second position, the load cells 60, 62 again measure force values F1, F2 and provide these measurements to the PLC 28. The PLC 28 then compares these force values F1, F2 to determine if the values are equal or within a predetermined standard deviation of one another. If the force values F1, F2 are still not equal (or within a predetermined standard deviation of one another), the PLC 28 determines that the horn 26 and anvil 14 are in a non-level arrangement and operates the actuator 32 to reorient the horn 26 relative to the anvil 14—with the actuator 32 causing the horn 26 to continue to rotate in the first direction, from the second position to a third position. The PLC 28 continues to operate actuator 32 in this manner until it is determined that the values F1, F2 are equal or within a predetermined standard deviation of one another— with the horn 26 and anvil 14 in a level or parallel arrangement Referring to FIG. 7, a graphic analysis of the force value readings F1, F2 over time is shown for purposes of illustration. During the time span 64, the force values F1 and F2 are the same or within a predetermined suitable standard deviation. Force readings having an equal value or that are within a predetermined suitable standard deviation indicates that the ultrasonic horn 26 is level with respect to the anvil 14. At a transition point 66, the force value for F1 drops—indicating a distance D1 separation between the ultrasonic horn 26 and the anvil 14. The drop in the force value F1 is indicated by the graphic illustration section drop 68. Additionally, at a transition point 66, the force value for F2 rises—indicating a distance D2 separation between the ultrasonic horn 26 and the anvil 14. The rise in the force value F2 is indicated by the graphic illustration section rise 70. The graphical readings of F1 and F2, as indicated at 68 and 70, indicate the ultrasonic horn 26 is not level with respect to the anvil 14, as the force values F1, F2 are not equal and not within a predetermined suitable standard deviation. Referring to FIG. 8, a graphic analysis of the force value readings F1, F2 over time illustrates that the ultrasonic horn 26 is level with respect to the anvil 14. During the time span 72, the force values F1 and F2 are thus the same or within a predetermined standard deviation.

Figure 9:
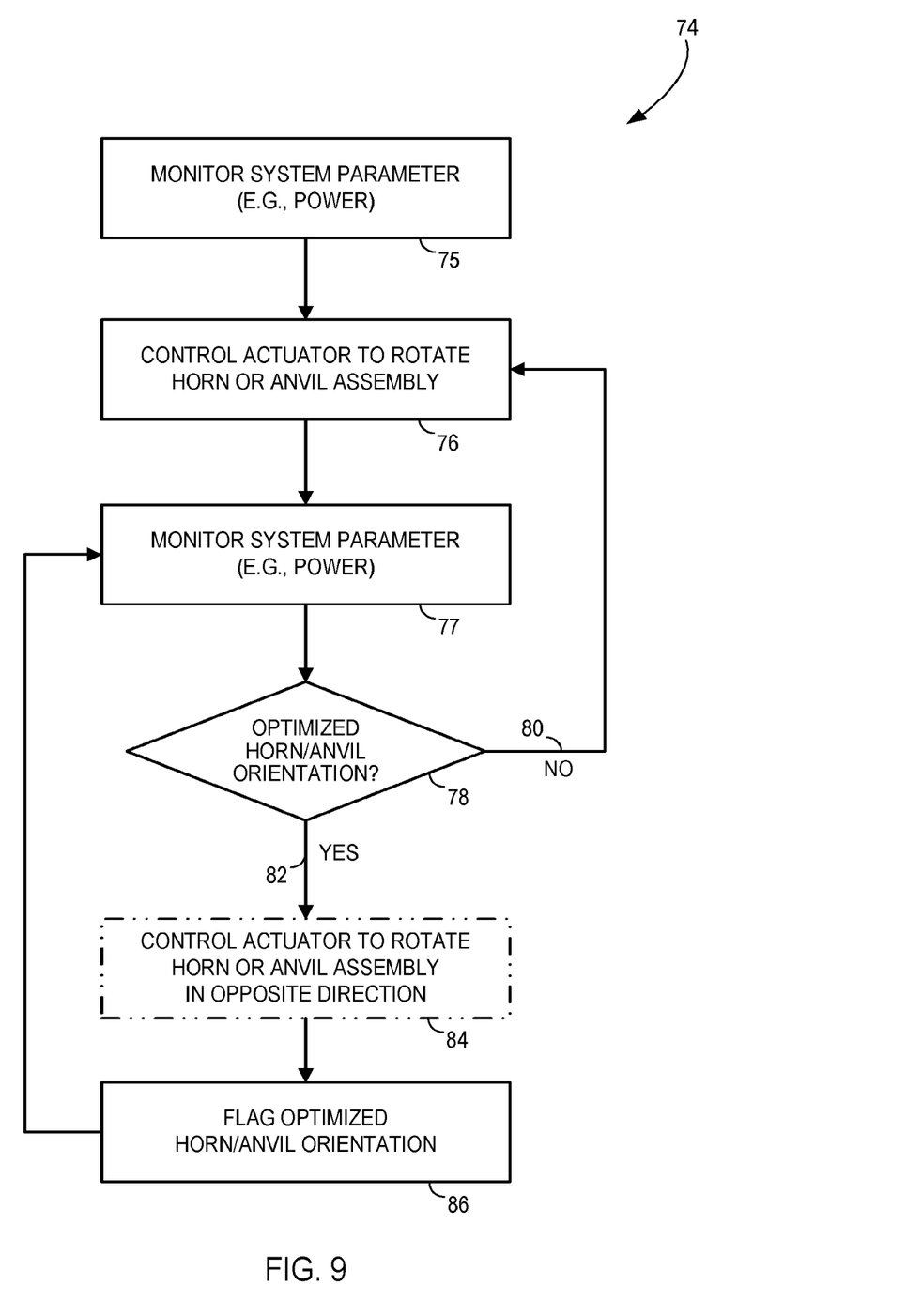
FIG. 9 is a flowchart illustrating a method for leveling an ultrasonic horn and anvil in an ultrasonic assembly via a closed-loop control system, according to an embodiment of the invention.

Referring now to FIG. 9, and with continued reference to FIGS. 1-6, a method 74 for leveling an ultrasonic horn 26 and anvil 14 in an ultrasonic assembly 10 via a closed-loop control system 16 is shown, according to an embodiment of the invention.

The method 74 begins at STEP 75 with the monitoring of one or more operational parameters of the ultrasonic assembly 10. According to embodiments of the invention, the measurements may be acquired via direct monitoring, measurement, or calculation by the generator 30, by an induction sensor 50 positioned on (or spliced into) the high frequency cable 36 connecting the generator 30 and ultrasonic horn assembly 12, or by external sensor(s) 60, 62 integrated with the horn 26 or anvil 14. The operational parameters monitored by the generator 30 may comprise one of power, frequency, amplitude, or charge/capacitance, as non-limiting examples. The operational parameter measured by the induction sensor 50 may comprise current. The operational parameters measured by the external sensors 60, 62 may comprise force, distance (between the horn and anvil), or temperature, as non-limiting examples.

At STEP 76, the PLC 28 causes the actuator 32 to iteratively rotate the horn 26 (or anvil 14 in an alternative embodiment) in a first direction. The operational parameter is measured again at STEP 77.

At STEP 78, a determination is made as to whether the horn 26 and anvil 14 are in an optimized parallel or level arrangement based on the monitored operational parameters acquired at STEP 75 and STEP 77. The PLC 28 receives the operational parameters and performs an analysis thereof via a comparison of the operational parameters in order to determine the leveling condition.

In an embodiment where the acquired operational parameter comprises power readings, acquired either via generator 30 directly or via induction sensor 50, STEP 78 includes the PLC 28 functioning to operate the actuator 32 to iteratively reorient the ultrasonic horn 26 relative to the anvil 14 until an optimized horn and anvil orientation is identified. The identification of the optimized orientation is obtained via the PLC 28 causing the actuator 32 to iteratively rotate the horn 26 in a first direction and acquiring updated power readings after each rotation. The PLC 28 compares power readings after each rotation and, when a subsequent power value reading is greater than the immediately preceding power reading, the PLC 28 will determine that facing surfaces 27, 29 of the horn 26 and anvil 14 are not in an optimized orientation or parallel/level relative to one another (as indicated at 80). The PLC 28 will then cause the actuator 32 to continue to rotate the horn 26 in the first direction at STEP 76— with the method then looping back to STEP 77 for further monitoring of power values.

In the event that a subsequent power reading that is less than the immediately preceding power reading, the PLC 28 may take one of two actions. In one embodiment, the PLC 28 identifies the current horn/anvil orientation as corresponding to an optimized orientation (as indicated at 82). Thereafter, the current horn/anvil orientation is flagged as an optimized level condition or parallel orientation at STEP 86. Alternatively, upon determining that a subsequent power reading that is less than the immediately preceding power reading, method 74 may proceed to optional STEP 84 wherein the PLC 28 controls the actuator 32 to rotate the horn 26 in a second direction (opposite the first direction) to return to the previous position. The resulting horn or anvil position is flagged as an optimized level condition or parallel orientation at STEP 86. Thereafter, the method loops back to STEP 77 for further monitoring of power values.

In an embodiment where the acquired operational parameter is an operational parameter (e.g., force or distance readings) acquired via external sensors 60, 62, method 74 includes the PLC 28 functioning to operate the actuator 32 to iteratively reorient the ultrasonic horn 26 relative to the anvil 14 until sensor readings from generally opposing sides of the horn 26 (or anvil 14) are equal or within a predetermined standard deviation. If the force/distance values from opposing sides of the horn 26 or anvil 14 are equal or within a predetermined standard deviation of one another, the PLC 28 determines that the horn 26 and anvil 14 are in an optimized level or parallel arrangement (as indicated at 82) and flags the orientation as optimized at STEP 86. The PLC 28 thus does not send command signals to the actuator 32, and the method loops back to STEP 77 for further monitoring of power values. Conversely, if the force/distance values from opposing sides of the horn 26 or anvil 14 are not equal or within a predetermined standard deviation of one another, the PLC 28 determines that the horn 26 and anvil 14 are in a non-level arrangement (as indicated at 80) and thus causes the actuator 32 to reorient the ultrasonic horn 26 relative to the anvil 14 at STEP 76 and continue to monitor force/distance values at STEP 77.

While embodiments of the invention described above are directed to an ultrasonic assembly 10 and closed-loop system 16 for leveling of the horn 26 and anvil 14, it is recognized that the closed-loop control system 16 described above may also be utilized to monitor and adjust a gap between the horn 26 and anvil 14, according to another embodiment. That is, a closed-loop control system 16 may be employed for performing both gap control and leveling in the ultrasonic assembly 10.

Figure 10:
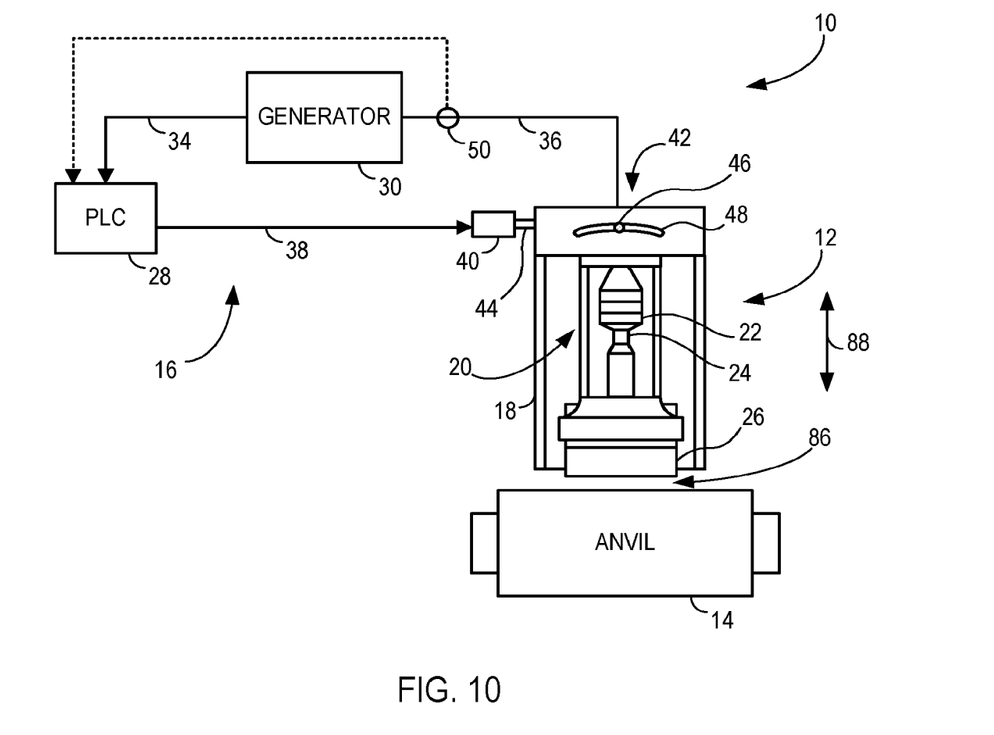
FIG. 10 is a system view of the bonding assembly of FIGS. 1 and 2 illustrating a gap adjustment between the ultrasonic horn and patterned anvil, according to another embodiment of the invention.

Referring now to FIG. 10, the ultrasonic assembly 10 is illustrated where closed-loop control system 16 operates to perform a gap adjustment between the horn 26 and the anvil 14. In performing such a gap adjustment, the generator 30 acquires a plurality of operational parameter measurements that are indicative of the operation of the ultrasonic assembly 10 and of a gap or distance 86 of the horn 26 from the anvil 14. The generator 30 provides those measurements to the PLC 28 for comparison thereof and determination of the gap/distance 86. The operational parameter measurements may comprise power, capacitance, frequency, or amplitude as non-limiting examples. In one exemplary embodiment, the PLC 28 compares a plurality of power readings in order to maintain a predetermined target power value that corresponds to a desired gap between the horn 26 and the anvil 14.

As with performing leveling in the ultrasonic assembly 10, the generator 30 may measure power values indicative of the interaction of the horn 26 with the anvil 14 (or capacitance, frequency, or amplitude) or, alternatively, induction sensor 50 may measure current/power values indicative of the interaction of the horn 26 with the anvil 14, in order to provide for a determination of an ideal gap distance between the horn 26 and the anvil 14. The measured power/current values are provided to the PLC 28, where comparison of the power/current values is performed in order to determine the ideal gap distance. The position of the horn 26, i.e., distance thereof from the anvil 14, is incrementally adjusted via operation of actuator 32 responsive to a plurality of comparisons of the power/current readings by the PLC 28 (such as from a distance D1, to a distance D2, to a distance D3) until the PLC 28 achieves a predetermined target value that corresponds to an ideal gap distance between the horn 26 and the anvil 14. That is, actuator 32 moves ultrasonic horn assembly 12 (i.e., horn 26) in a direction 88 until a gap/distance 86 is set that corresponds with the target power/current value.

Figure 11:
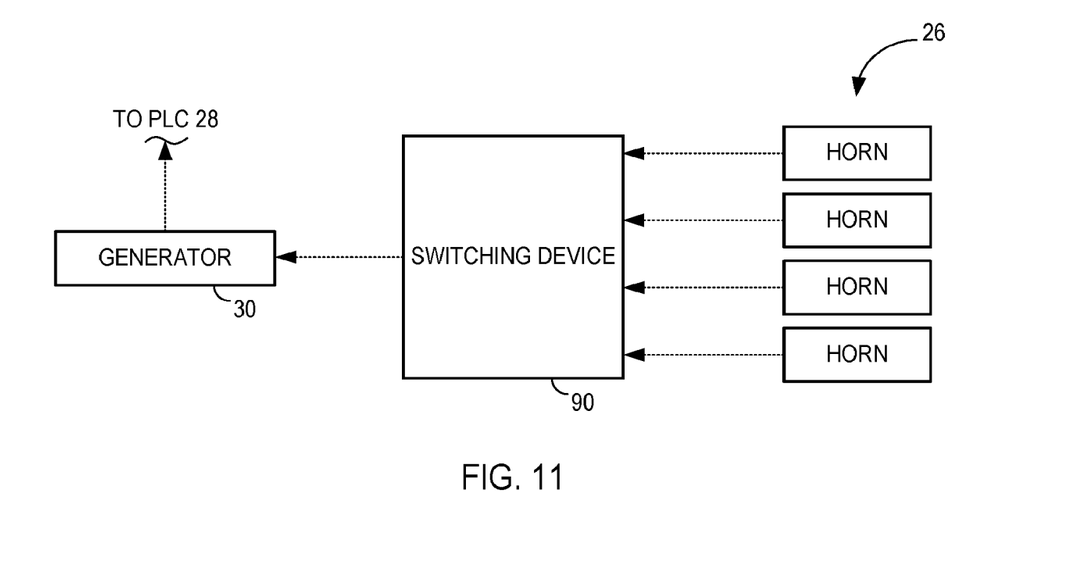
FIG. 11 is a block schematic diagram of multiple ultrasonic horns operably coupled with a single generator, useable with the bonding assembly of FIGS. 1 and 2, according to an embodiment of the invention.

It is recognized that embodiments of the present invention, including the method 74 shown and described in FIG. 9, may be implemented is various types of ultrasonic assemblies. In one embodiment, and as shown in FIG. 11, an ultrasonic assembly may be provided in which a single generator 30 may be used to gather power data from multiple ultrasonic horns 26 (associated with one or more anvils 14) and pass such data to a PLC 28 to determine a leveling condition of the horns. In such an embodiment, a switching device 90 is coupled between the generator 30 and the ultrasonic horns 26 that is operable to selectively transmit power (for example) from each of the respective ultrasonic horns 26 to the generator 30, to enable power measurement for each of the horns 26.

Beneficially, embodiments of the invention thus provide a closed-loop, automated apparatus and method for adjusting the gap, or distance, between the ultrasonic horn and the patterned anvil and/or for leveling or paralleling the ultrasonic horn and the patterned anvil relative to one another. The automated gap control and leveling system reduces the dependency on manual gap control and/or leveling of the ultrasonic horn and anvil. The automated gap control and leveling system also provides for gap control and/or leveling adjustments to be made while the ultrasonic assembly continues to run. The automated gap control and leveling system further provides for continued measurement of the gap distance and leveling condition between the ultrasonic horn and patterned anvil and adjusts the gap and/or leveling based upon the measurement results. Still further, the automated gap control and leveling system provides for gap control and/or leveling adjustments to be made due to a change in the operating speed of the manufacturing machine on which it operates, due to thermal growth of the ultrasonic horn, and/or due to material thickness of the web material or object subject to the ultrasonic frequency.

Therefore, according to one embodiment of the invention, an apparatus for forming bonds on a web includes an anvil, a bonding device positioned adjacent the anvil and configured to interact with the anvil to form the bonds on the web, and an actuator that enables adjustment of an orientation between the bonding device and the anvil. The apparatus also includes a closed-loop control system configured to control operation of the actuator, the closed-loop control system configured to monitor an operational parameter of the apparatus indicative of interaction of the bonding device with the anvil, determine whether the bonding device is parallel or substantially parallel with the anvil based on the operational parameter, and when the bonding device is not parallel or substantially parallel with the anvil, cause the actuator to adjust the orientation between the bonding device and the anvil.

According to another embodiment of the invention, a method for leveling a bonding device and anvil in an assembly via a closed-loop control system is provided. The method includes monitoring an operational parameter of the assembly indicative of interaction of the bonding device with the anvil and determining, based on the operational parameter, whether the bonding device and the anvil are parallel or substantially parallel. The method also includes controlling an actuator to adjust an orientation between the bonding device and the anvil when the bonding device and the anvil are determined to not be parallel or substantially parallel. The monitoring of the operational parameter and the operation of the actuator to adjust the orientation between the bonding device and the anvil is performed via a closed-loop control scheme.

According to yet another embodiment of the invention, an apparatus for forming bonds on a web includes an anvil, a bonding device positioned adjacent the anvil and configured to interact with the anvil to form the bonds on the web, and an actuator that enables adjustment of a spacing between the bonding device and the anvil. The apparatus also includes a closed-loop control system configured to control operation of the actuator. The closed-loop control system is configured to monitor an operational parameter indicative of interaction of the bonding device with the anvil, compare the operational parameter to a predetermined target value, and when the operational parameter does not match the predetermined target value, cause the actuator to move one of the bonding device and the anvil to adjust the spacing between the bonding device and the anvil. The closed-loop control system is configured to compare a plurality of operational parameters to the predetermined target value and cause the actuator to incrementally adjust a position of one of the bonding device and the anvil to adjust the spacing between the bonding device and the anvil. The position of one of the bonding device and the anvil is adjusted until the monitored operational parameter matches the predetermined target value. In one embodiment the bonding device is an ultrasonic horn. In one embodiment the operational parameter comprises a power value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus for forming bonds on a web, the apparatus comprising:
   an anvil;
   a bonding device positioned adjacent the anvil and configured to interact with the anvil to form the bonds on the web;
   an actuator that enables adjustment of an orientation between the bonding device and the anvil;
   a closed-loop control system configured to control operation of the actuator, the closed-loop control system configured to:
   monitor an operational parameter of the apparatus indicative of interaction of the bonding device with the anvil;
   determine whether the bonding device is in an optimized arrangement with the anvil based on the operational parameter; and
   when the bonding device is in an optimized arrangement with the anvil, cause the actuator to iteratively adjust the orientation between the bonding device and the anvil.

2. The apparatus of claim 1, wherein the operational parameter is a power value, wherein the closed-loop control system is configured to cause the actuator to iteratively adjust the orientation between the bonding device and the anvil between each determining of successive power values.

3. The apparatus of claim 2, wherein the optimized arrangement includes the bonding device being parallel or substantially parallel with the anvil.

4. The apparatus of claim 3, wherein the bonding device comprises an ultrasonic horn.

5. The apparatus of claim 4 wherein the closed-loop control system is
   configured to:
   determine a plurality of power values associated with interaction of the ultrasonic horn with the anvil, with a respective power value of the plurality of power values being determined for each of a plurality of orientations of the ultrasonic horn relative to the anvil; and
   cause the actuator to iteratively adjust the orientation between the ultrasonic horn and the anvil between each determining of successive power values.

6. The apparatus of claim 5, wherein the power values are indicative of the operation of the ultrasonic horn and of a levelling condition of the ultrasonic horn with respect to the anvil.

7. The apparatus of claim 4 wherein the closed-loop control system is configured to:
   compare each successive pair of power values;
   identify a maximum power value associated with interaction of the ultrasonic horn with the anvil from the comparison of each successive pair of power values; and identify the orientation of the ultrasonic horn and the anvil at which the maximum power value was measured or determined as an orientation at which the ultrasonic horn is parallel or substantially parallel with the anvil.

8. The apparatus of claim 6 wherein the closed-loop control system is configured to:
   compare a first power value of a pair of successive power values to a second power value of the pair of successive power values;
   cause the actuator to rotate one of the ultrasonic horn and the anvil in a first direction if the second power value is greater than the first power value; and
   cause the actuator to rotate one of the ultrasonic horn and the anvil in a second direction opposite the first direction if the second power value is less than the first power value;
   wherein iterative rotation of one of the ultrasonic horn and the anvil based on the comparison of the first power value to the second power value positions the ultrasonic horn parallel or substantially parallel with the anvil.

9. The apparatus of claim 4 wherein the closed-loop control system comprises:

a generator in operable communication with the ultrasonic horn, via a cable, to cause the ultrasonic horn to output an ultrasonic emission; and a programmable logic controller (PLC) in operable communication with the generator and with the actuator, the PLC configured to control operation of the actuator.

10. The apparatus of claim 6 further comprising an induction sensor positioned on or spliced into the cable, the induction sensor configured to:

measure the plurality of power values; and provide the plurality of power values to the PLC.

11. The apparatus of claim 1 wherein the actuator is operatively coupled to either the bonding device or the anvil to selectively adjust the orientation thereof.

12. The apparatus of claim 1, wherein the actuator is configured to adjust a gap between the bonding device and the anvil; and wherein the closed-loop control system is configured to cause the actuator to adjust the gap between the bonding device and the anvil based on the operational parameter.

13. A method for levelling a bonding device and anvil in an assembly via a closed-loop control system, the method comprising:

monitoring a first operational parameter of the assembly indicative of interaction of the bonding device with the anvil;

determining, based on the operational parameter, whether the bonding device and the anvil are in an optimized arrangement; and when the bonding device and the anvil are determined to not be in an optimized arrangement, controlling an actuator to adjust an orientation between the bonding device and the anvil;

wherein the monitoring of the operational parameter and the operation of the actuator to adjust the orientation between the bonding device and the anvil is performed iteratively via a closed-loop control scheme.

14. The method of claim 13 wherein the bonding device comprises an ultrasonic horn, and wherein monitoring the operational parameter comprises measuring a plurality of power values indicative of interaction of the ultrasonic horn with the anvil, the plurality of power values measured at differing orientations between the ultrasonic horn and the anvil.

15. The method of claim 13, wherein upon adjusting orientation between the bonding device and the anvil to a second position, the method further comprises monitoring a second operational parameter of the assembly indicative of interaction of the bonding device with the anvil, wherein the second operational parameter does not have the same value as the first operational parameter, and controlling the actuator a second time to adjust an orientation between the ultrasonic horn bonding device and the anvil.

16. The method of claim 13, wherein the actuator is operated to successively rotate the bonding device to one or more new positions, and wherein at each new position a new operational parameter is monitored, and wherein the bonding device is rotated into a new position until an operational parameter with an optimized value is obtained.

17. The method of claim 16, wherein the operational parameter is a power value, and wherein the optimized value is a maximum power value.

18. The method of claim 17 wherein adjusting the orientation between the bonding device and the anvil comprises iteratively adjusting the orientation between the bonding device and the anvil until a maximum power value is obtained.

19. The method of claim 17 wherein determining whether the bonding device and the anvil are in an optimized arrangement comprises:

comparing successive pairs of power values from a plurality of power values;

identifying the maximum power value from the comparison of each successive pair of power values; and identifying the orientation of the bonding device and the anvil at which the maximum power value was measured as an orientation at which the bonding device is in an optimized arrangement with the anvil.

20. The method of claim 13 wherein monitoring the operational parameter comprises measuring force values indicative of interaction of the bonding device with the anvil, the force values measured by a pair of load cells positioned on or integrated with one of the bonding device and the anvil and comprising:

a first force value measured at a location on a first side of the one of the bonding device and the anvil; and a second force value measured at a location on a second side of the one of the bonding device and the anvil.

21. The method of claim 13, wherein determining whether the bonding device and the anvil are in an optimized arrangement comprises:

determining that the bonding device is in an optimized arrangement with the anvil when a first power value is equal to a second power value or is within a predetermined standard deviation of the second power value; and determining that the bonding device is not in an optimized arrangement with the anvil when the first power value is not equal to the second power value and is not within the predetermined standard deviation of the second power value.

22. The method of claim 13 wherein adjusting the orientation between the bonding device and the anvil comprises one of adjusting the orientation of the bonding device and adjusting the orientation of the anvil.

* * * * *

UNITED STATES PATENT AND TRADEMARK OFFICE
CERTIFICATE OF CORRECTION

PATENT NO. : 11,660,851 B2
APPLICATION NO. : 17/869910
DATED : May 30, 2023
INVENTOR(S) : Lafferty et al.

It is certified that error appears in the above-identified patent and that said Letters Patent is hereby corrected as shown below:

In the Claims

In Column 14, Line 9, Claim 1, after "bonding device is", insert -- not --.

Signed and Sealed this
Twenty-fifth Day of June, 2024

Katherine Kelly Vidal
*Director of the United States Patent and Trademark Office*